April 6, 1971 L. D. BRAGG. JR 3,574,106
LEATHER-LIKE LAMINATED SHEET MATERIALS
Filed Oct. 2, 1968
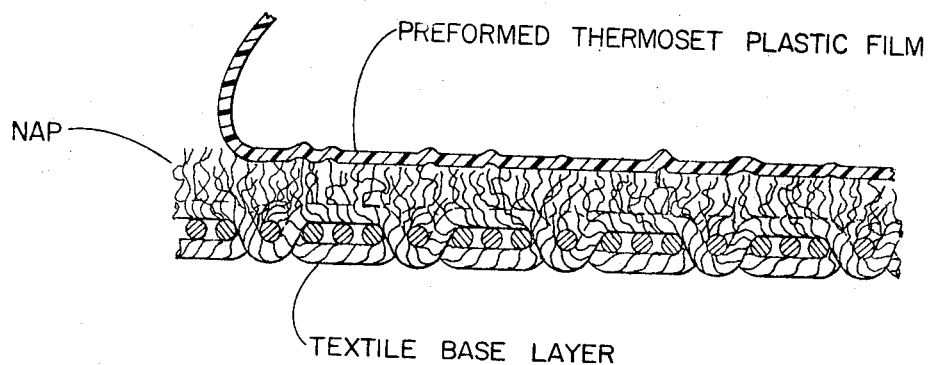

United States Patent Office 3,574,106
Patented Apr. 6, 1971

3,574,106
LEATHER-LIKE LAMINATED SHEET MATERIALS
Lawrence D. Bragg, Jr., Wellesley, Mass., assignor to Plymouth Rubber Company, Inc., Canton, Mass.
Filed Oct. 2, 1968, Ser. No. 764,531
Int. Cl. B32b *3/00;* D06n *3/00*
U.S. Cl. 161—53
7 Claims

ABSTRACT OF THE DISCLOSURE

Leather-like laminated sheet materials useful for upholstery, luggage, shoe materials or the like, comprising a fibrous somewhat stretchable textile base layer and an overlying separate, distinct, relatively thin pre-formed thermoset plastic elastic skin layer of uniform thickness mounted thereabove and adhesively anchored to the top ends and upper portions of upwardly extending (preferably napped) fibers of the upper surface of said base layer, the two said opposing layers together providing, to an exceptional degree, a flexible, soft-hand, conformable tough laminate but leaving said thin pre-formed plastic elastic skin layer to a substantial degree free locally elastically to stretch and retract, shift and wrinkle with respect to the underlying base layer, thus simulating grain leather physical characteristics and appearance. In addition, the exposed surface of the pre-formed skin layer of the laminate of the invention may or may not include a surface finish (colored or ornamented or not as preferred) including a slight difference in relief—patterned or not, an additional top finish layer, or both, obtained by casting, embossing, coating or printing, even rotogravure printing, or by incorporating special finely divided, solid ingredients in the skin layer itself to provide a dull, matte, metallic, or gloss surface finish as may be desired for various intended uses.

---

The present invention relates to leather-like laminated sheet materials, particularly useful for upholstery, but also useful for exterior garments, footwear, luggage, and various sporting goods items, comprising a fibrous, somewhat stretchable textile base or backing layer and an overlying separate, distinct, relatively thin preformed thermoset plastic, elastic skin layer of uniform thickness mounted thereabove, and adhesively anchored to fibers upwardly extending from the body of the upper surface of said base layer. Thus, the two said opposing layers with connecting fibers therebetween, together provide a flexible, soft hand, conformable, tough, abrasive-resistant laminate with the said thin plastic, elastic skin layer free locally to stretch and retract, shift and wrinkle with respect to the base layer, simulating physical and aesthetic characteristics of natural grain leather. In addition, as above indicated, the exposed surface of the laminate may or may not include coloring, fine indentations, embossing, and any desired suitable coating or printing, ornamental or not, as may be desired, according to the various intended uses, as hereinafter appears.

Heretofore, for some years past and presently, artificial leathers of commerce have mostly comprised a plasticized relatively thick vinyl or other elastomeric thermoplastic coating, applied as a liquid or semi-liquid, upon, and in part impregnating, an openly woven or knitted fabric base, usually knitted, and have been widely used for the general purposes of the present invention. Also, commonly, such products have included a simulated grain leather appearance accomplished by embossing the vinyl surface with an engraved roll. The appearance of the grain, though distorted when stretched, was otherwise "set" or substantially unchanging in use, whereas natural leather is variable when new and varies greatly as to conformation, wrinkling, etc. under the physical conditions encountered in normal use. Also, such vinyl coated fabrics varied undesirably with varying temperature conditions, were hot or sticky, cold, stiff or clammy, and produced static attraction, charred readily when exposed to flame, had low tear resistance (when soft and pliable), and were stained and/or embrittled by various substances such as ink, lipstick, carbon paper, grease, and various artificial and natural oils. Nor were such products dry cleanable, or (when used in thin layers) particularly resistant to scratching, scuffing, or abrasion. Further, in actual use they resisted the desirable body and surface wrinkling characteristics of soft fine grain leathers, kid leathers for example. As above indicated, such prior coated fabrics, involving the application of coatings which penetrated and impregnated to substantial non-uniform extent down into the underlying irregularities and openings of the woven or knitted fabric base materials and thus varied in thickness with reduced tear strength and flexibility, with the latter causing lack of drape and conformability.

This invention aims to provide leather-like laminates which, in their preferred forms, avoid or minimize the above-noted objections, and supplies needed and more acceptable novel commercial products having more of the desirable characteristics of natural leather, both qualitatively and quantitatively, and even, in some respects, improves thereon.

Specifically referring to the leather-like laminate of the present invention and the products thereof, a sample of the product of the invention is very generally illustrated in the accompanying enlarged and somewhat diagrammatic drawing (not to exact scale). In its preferred forms, the example of the invention includes a cotton or other cellulosic base fabric of somewhat open weave drill or twill, and with the base fabric after weaving being then compacted or reduced in both dimensions, to render it universally quite extensible in use, by reason of conventional mechanical, caustic, and/or steam treatments (to provide the herein termed "compacted" base fabric), as well known and practised in the manufacture of various textile fabrics. Desirably, in its preferred form, the resultant fabric thus compacted has at least a 12–15% elongation at break, as against 4–8% for the same woven fabric without compacting treatment, and the thickness of the final fabric with nap is about 200–300% of that of the original fabric. For less exacting end uses, napped non-woven fibrous cellulosic sheet materials may be employed. Also, other than cellulosic fibers may be employed.

Preferably, for example, a cotton base fabric, somewhat loosely woven, e.g. 72 x 56, of ordinary sizes of cotton yarns, weighing about 9 oz. per sq. yd. and about .018"–.020" in thickness is thereafter compacted and treated so as to then count 80 x 64 and weigh about 11 to 12 oz. per sq. yd., to provide an extensibility of at least 10–12% in both the warp and filling directions of the backing, respectively, desirably about the same in each such direction, preferably to produce a nearly "balanced stretch," particularly desirable in the manual manipulation and necessary stretching and conforming required in application and use of the final product in the upholstery field, including tufting and welting.

During or after the steps of imparting to the base fabric the desired degree of enhanced stretch capability in all directions, the fabric base is so treated and processed as to provide a relatively uniform, dense, lofty mass or nap of individual fibers anchored thereto, but upwardly extending therefrom to any suitable height, for example, of the order of .015"–.035". Preferably, such springy mass of upstanding fibers, nap, or pile, is produced by conventional napping and shearing, though a useful end result may be produced otherwise, as by known pile fabric or flocking techniques, or even rigorous wire brushing, particularly if core or other suitable special yarns be exposed at such face of the fabric as originally woven, the end result, in any case, for convenience herein, being herein generally termed "nap" or "napped," however provided. Thus, the invention requires that there be provided on and anchored to the base fabric, woven or nonwoven, a lofty, dense, springy mass (nap) of fibers having freedom from each other, and to which the overlying pre-formed thin plastic surface layer may be attached, but with a substantial degree of freedom or movement of at least local areas of said layer with respect to the body of the base fabric, and to a degree that desirably may substantially exceed the skin freedom of natural soft thin grain leather.

Following the provision of the base fabric with the mass (nap) of springy upstanding fibers, as described, a preformed top layer of plastic is mounted on and adhesively attached to the exposed upper ends and/or uppermost portions only of such fibers, providing inter-fiber voids therebetween. Such top layer requires a preformed relatively thin, tough, flexible ultimately thermoset plastic elastic skin layer of substantially uniform thickness. The attachment of the two layers, base and top, through and by reason of the springy upstanding fibers therebetween, permits, in the laminated product, limited independent movement of the skin layer, leaving it to a very significant and important degree free locally to stretch and retract, raise or depress, shift and wrinkle and recover, providing, when stretched, many fine wrinkles, with little regard to the conformation of the underlying base layer (though the extent of such top layer wrinkled configuration is necessarily limited by the length or height of the pile or nap), thus simulating many desirable physical and aesthetic characteristics, and appearance, of thin fine grain leather—for example kid leather—as above mentioned, as well as providing some unique characteristics of its own.

For the top layer, a thermosetting plastic preformed film is provided and, indeed, required in order to secure the necessary desirable physical characteristics and qualities, as compared with an ordinary thermoplastic film of vinyl or the like, as will be apparent from the foregoing. A thermosetting plastic provides a superior preformed film particularly where as here a thin, tough, elastic film is required that quite fully supplies advantages lacking in thermoplastics. Thus, the presently preferred thermosetting plastic is polyurethane (polyester or polyether) though other usable thermosetting resins include other polyesters, aminos (melamine and ureas), and cross-linked acrylo-nitriles and polyethylenes.

Though the preformed film may be made in various ways, a satisfactory procedure is to form thin films of about 0.003–0.006", by casting upon a temporary backing (e.g. a coated release paper, with or without surface indentation) which has little or no affinity for the plastic material used in making the film, and thereafter separate the release paper. Such a film may contain a pigment and/or dyestuff to impart any desired degree of coloring or opacity required. If a breathable preformed film is required, such may be accomplished by the introduction of very fine air bubbles in controlled small amount, into the coating solution before casting on the temporary paper backing, though at the expense of some strength, stretch, and abrasion resistance of the final film. A preformed film of the thermosetting type after being so cast is then gelled but not cured, leaving it temporarily thermoresponsive to the required degree to allow it to become soft, tacky, and to adhere to the nap when it is combined therewith, under the influence of heat and light pressure prior to being finally heat-set. Thus, the preformed thermosettable film may be applied to the nap in such a manner as to preserve the uniform thickness of the plastic film, to obtain adequate adhesion by reason of the substance of the uncured film itself, and without impairing the fiber-freedom and springy character of the nap intervening between and connecting the preformed film and the base fabric per se. Also, during the application of the preformed film, and to enhance the "shifting skin" effect, it is found and normally preferable that such be accomplished with a controlled slight back tension to the fabric so as to insure that when the combining is complete, and such fabric back tension released, the film will be under no tension and, preferably, under slight compression, even such as to somewhat compress the film and, as a result, normally form therein occasional or random fine upwardly extending reversely-bent (even up to 180°) wrinkles in the top film portion of the laminate (as indicated in the drawing), though with the film always free to more grossly bend and bodily wrinkle with, as, and when the base fabric bends or wrinkles.

Alternatively, and preferably, the preformed top film may be affixed to the nap, and the strength of the bond thereto materially increased, by means of a subsequently and separately applied very thin, e.g. .0015"±, adhesive layer (of chemically the same, or a compatible, thermosetting plastic) applied in liquid or semi-liquid tacky form to the preformed film just prior to combining or laminating it to the nap, and final curing. Thus, when so formed, the opposite sides of the surface layer may have different desirable characteristics. This is a very considerable practical advantage in that the outside or exposed surface zone can be hard, to better resist severe wear conditions (as in upholstery, for example), whereas the interior surface zone is, at least initially, relatively soft for better adhesion and bond to the nap.

The exposed surface of the preformed film of the laminate may be modified in various ways during the course of its formation (before being combined with the napped face), if desired, to provide a special surface, appearance, or finish difference in relief. For example, the surface of a temporary paper backing may be modified and used in casting into the film any such slight indentations or difference in relief, all-over or pattern, as may be desired to appear in the preformed film, or to change the normally glossy surface finish. Moreover, the release paper permits the film to become thermoset while the film is on the temporary carrier, whether or not the carrier be embossed, sculptured, etc. Also, it may be desired to provide an even smoother and more "slippery" surface finish (e.g. for upholstery) and this may be readily accomplished by a separate top coating, also preferably thermosetting, with or without an additional step of an extra top coating (first applied to the carrier) by incorporating additives such, for example, as silicone gum, silicone resins ethyl cellulose, polyethylene, etc., into the skin coat itself. Such a thermosetting outer coat, clear or colored, say 0.001" in thickness, desirably may be provided by initially applying it to the release paper and first curing such coating, with or without a subsequent printing thereon, discontinuous or not, before casting thereover the main body of the surface film, the lower or inner surface of which is to be directly applied and adhere to the nap when combined therewith.

Embossing, coating or printing, even rotogravure printing, thus may be incorporated in, or added to, the preformed film at any time prior to its attachment and final curing. My preferred method of any such rotogravure printing is believed to be novel in that it involves the use of a catalyzed activated saline silicone solution of as low as 5% solids (though up to 10 or 12% may be employed) but meanwhile, during application, maintaining the temperature of the solution 15° C. or lower thereby both raising or controlling its viscosity to the required viscosity level for such printing, and thus preventing premature curing of the silicone solution while in the cells or depressions of the chilled printing roll so as to permit and provide for continuous printing.

Regardless of whether the exposed surface of the plastic skin layer be modified, decorated, or not, as described above, such layer, preferably with paper still attached, is then applied and adhesively bonded to the nap of the base layer, and finally cured in situ to complete the laminated product of the invention, the carrier paper being removed at the time of or shortly following such combination, all in accordance with my preferred procedure.

The final laminated product has an equal or higher degree or percent of bias extensibility (preferably at least about 50% in 45° bias directions), of particularly utility in upholstery tufting applications. Also, the finished products of the invention normally have a stretch, warp and fill, of about 8% and 12%, respectively. Importantly, too, the plastic surface layer of the finished product by standard (Wyzenbeek) wear test using #8 cotton duck, two pounds tension and two pounds pressure at 72° F. at 70% humidity, exhibits an abrasion resistance of 50,000–60,000 cycles before evidence of "crocking" (transfer to the duck surface) of particles of the plastic surface layer of the product prior to disintegration thereof.

Having described my invention, I claim:

1. A leather-like laminated sheet material comprising:
   a relatively thick stretchable woven base layer of fibrous textile material,
   a uniform dense layer of nap with fibers thereof having their lower portions anchored to and upwardly extending from said base layer, and of a normal uncompressed thickness of at least 50–100% of the thickness of said base layer,
   and a preformed tough relatively thin elastic plastic skin layer of uniform general thickness not more than about 0.006 inch overlying and permanently adhesively attached to the top ends and uppermost portions only of the said upwardly extending fibers providing voids therebetween, and with said thin elastic skin layer, to a very substantial degree, free independently locally to stretch and retract, shift and wrinkle with respect to said base layer and also capable of correspondingly bodily stretching, bending or wrinkling with, as and when the base fabric bodily stretches, bend or wrinkles,
   said sheet material having a stretch in each lengthwise and crosswise dimension of at least about 8–10 percent and a 45 degree bias extensibility of at least about 50 percent.

2. A leather-like sheet material as claimed in claim 1 having a thermoset plastic skin layer of uniform general thickness of about .003–.006".

3. A leather-like sheet material as claimed in claim 2 with said plastic skin layer having an abrasion resistance by Wyzenbeek test of at least about 50,000 cycles.

4. A leather-like laminated sheet material as claimed in claim 1 in which said plastic skin layer presents a decorative difference in relief.

5. A leather-like laminated sheet material as claimed in claim 1 in which said plastic skin layer presents a decorative printed design.

6. A leather-like laminated sheet material as claimed in claim 1 in which said plastic skin layer presents a decorative printed design with a transparent coating thereover.

7. A leather-like sheet material as claimed in claim 1 in which said skin layer is polyurethane.

References Cited

UNITED STATES PATENTS

| | | | |
|---|---|---|---|
| 1,759,976 | 5/1930 | Cummings | 161—53 |
| 3,272,685 | 9/1966 | Kagan | 161—53 |
| 3,481,821 | 12/1969 | Brunner et al. | 161—53 |

DOUGLAS J. DRUMMOND, Primary Examiner

U.S. Cl. X.R.

161—67, 88